(12) United States Patent
Simon et al.

(10) Patent No.: US 8,534,862 B2
(45) Date of Patent: Sep. 17, 2013

(54) AUTOMOTIVE CUP HOLDER WITH ADJUSTABLE LIGHT-EMITTING RETAINERS

(75) Inventors: James Scott Simon, Dexter, MI (US); Raymond Anthony Oldani, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 361 days.

(21) Appl. No.: 12/945,187

(22) Filed: Nov. 12, 2010

(65) Prior Publication Data
US 2012/0118930 A1 May 17, 2012

(51) Int. Cl.
*F21V 33/00* (2006.01)

(52) U.S. Cl.
USPC .......................... 362/154; 362/548; 362/101

(58) Field of Classification Search
USPC ........... 362/26, 84, 101, 154, 249.01, 249.02, 362/249.16, 255, 276, 310, 311.01, 311.02, 362/488, 511, 551, 555, 562, 565, 602, 605, 362/800, 802, 806
See application file for complete search history.

(56) References Cited

U.S. PATENT DOCUMENTS

| D428,308 S | 7/2000 | Hartmann et al. |
|---|---|---|
| 7,108,239 B2 | 9/2006 | Takahashi |
| 7,229,196 B2 * | 6/2007 | Hulse ............................ 362/341 |
| 7,597,300 B2 | 10/2009 | Harada |
| 2003/0197104 A1 | 10/2003 | Heybl et al. |
| 2007/0171674 A1 | 7/2007 | Deutsch |
| 2009/0152285 A1 | 6/2009 | Kearney et al. |
| 2009/0175049 A1 | 7/2009 | Lota |
| 2010/0032995 A1 | 2/2010 | Tarter et al. |
| 2012/0075842 A1 * | 3/2012 | Goto ............................ 362/154 |

FOREIGN PATENT DOCUMENTS

| JP | 2007203800 | 8/2007 |
|---|---|---|
| JP | 2007276604 | 10/2007 |

\* cited by examiner

*Primary Examiner* — Hargobind S Sawhney
(74) *Attorney, Agent, or Firm* — Jerome R. Drouillard; Vichit Chea

(57) ABSTRACT

An automotive cupholder has resiliently biased container retainers which are adjustable both translationally and rotationally, and which include integral light engines transmitting light through the retainers and into the container well of the cupholder.

14 Claims, 4 Drawing Sheets

AUTOMOTIVE CUP HOLDER WITH ADJUSTABLE LIGHT-EMITTING RETAINERS

BACKGROUND

1. Field of the Invention

The present invention relates to an adjustable, lighted cupholder for an automotive vehicle.

2. Disclosure Information

Cupholders are ubiquitous in contemporary automobiles. Motorists expect cupholders to firmly position beverage containers having a veritable plethora of shapes, sizes, and materials. Because some containers are conical and yet others are purely cylindrical, with all being formed from a variety of materials such as paper, plastic, aluminum, or yet other materials, and in configurations small and large, the task of managing such containers is complicated.

It is desirable to provide an automotive cupholder which is both configuration and size adjustable. In addition to adjustability, it is further desirable to provide a cupholder having lighting to indicate, inter alia, where the cupholder well is located, even when a cup has been installed into the cupholder.

SUMMARY

According to an aspect of the present invention, an automotive cupholder includes a container well and a plurality of resiliently biased retainers extending through a sidewall of the container well. A number of light engines provide illumination through the retainers and into the container well.

According to another aspect of the present invention, container well of the present cupholder has a generally circular cylindrical inner wall, with the container retainers being resiliently biased toward a longitudinal central axis of the container well.

According to another aspect of the present invention the cupholder's retainers are either transparent, translucent, or ported, with light engines projecting light through said retainers and into said container well.

According to another aspect of the present invention, each of the cup retainers preferably includes an elongate body having a concave surface for contacting a container, and a translational articulation slot permitting the elongate body to rotate and move translationally into contact with a container placed within said container well. In this manner, the retainers are adjustable to accommodate containers of various sizes and configurations.

It is an advantage of an automotive cupholder according to the present invention that containers having widely varying sizes and shapes may be accommodated.

It is another advantage of an automotive cupholder according to the present invention that the ambient light projected through the cupholder's retainers will be visible not only when the cupholder is empty, but also when a container has been placed within the cupholder.

It is another advantage of an automotive cupholder according to the present invention that the ambient light projected through the cupholder's retainers will track the location of the retainers, as well as any container carried in the cupholder, because light engines are mounted to the retainers themselves.

Other advantages, as well as features of the present invention, will become apparent to the reader of this specification.

DESCRIPTION OF INVENTION

Figure 1:
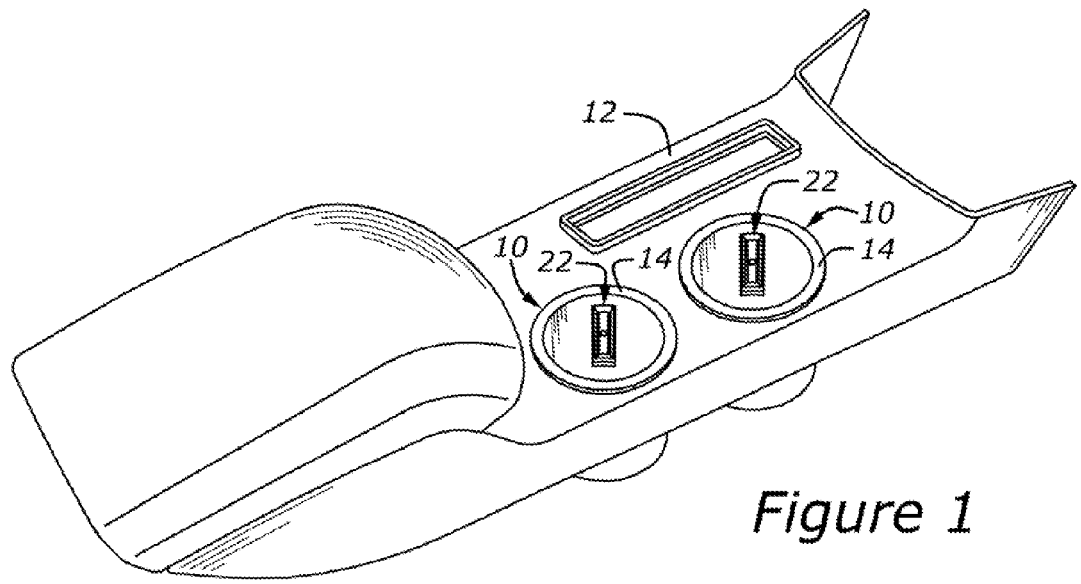
FIG. 1 is a perspective view of a cupholder, according to the present invention, which is shown as part of an automotive interior.
Figure 3:
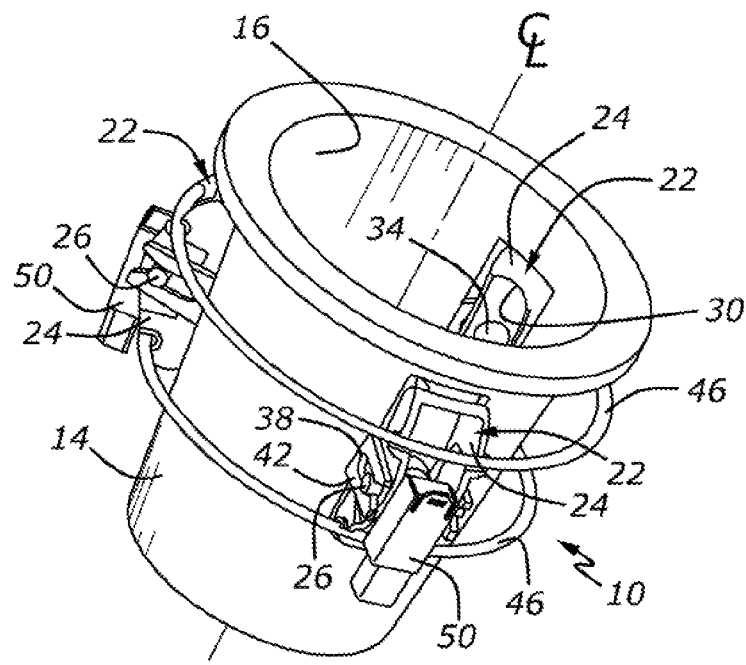
FIG. 3 is a perspective view of a cupholder well according to the present invention, having multiple retainers according to the present invention.
Figure 4:
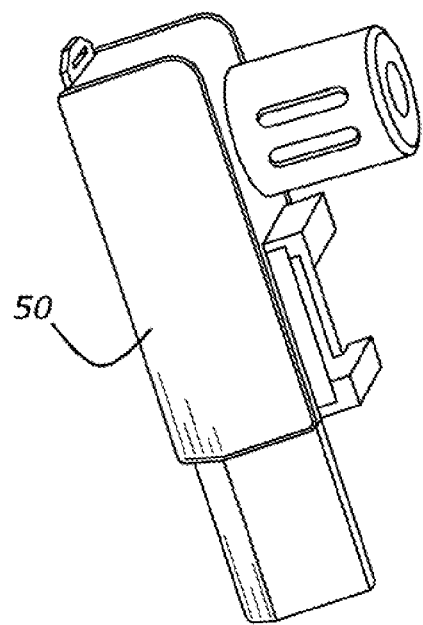
FIG. 4 illustrates a light engine suitable for use with the present inventive cupholder.

As shown in FIG. 1, the present cupholder, 10, is suitable for use in automotive interiors, such as the illustrated console, 12. Cupholder 10 is based upon a container well. 14, having a generally circular inner wall, 16 (FIG. 3).

Figure 2:
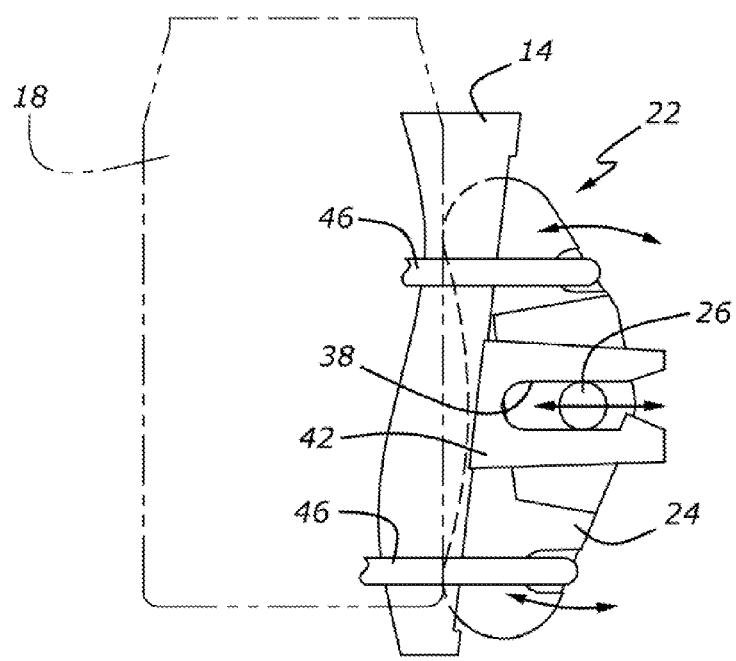
FIG. 2 is a partial side elevation of a cupholder according to the present invention, showing a retainer having a pivot pin engaging a translational articulation slot, with multiple elastic bands biasing the retainer toward the center of the container well.
Figure 5:
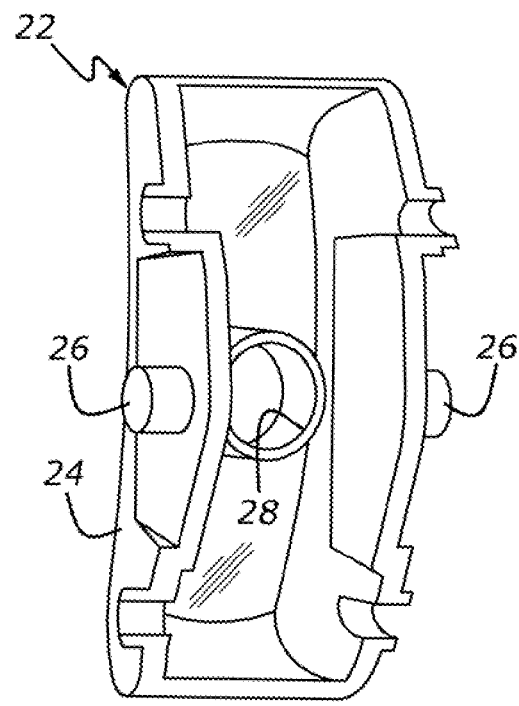
FIG. 5 is a rear perspective view of a cupholder retainer, showing a mounting arrangement for a light engine such as that shown in FIG. 4.
Figure 6:
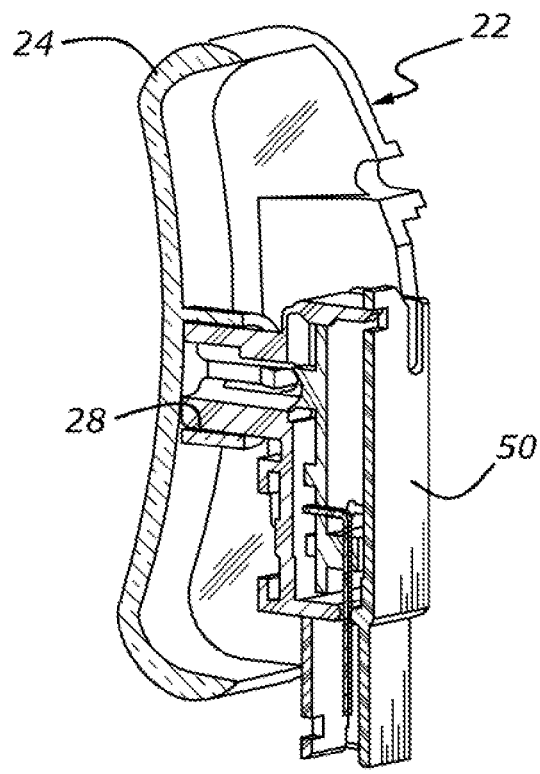
FIG. 6 is a perspective view showing the light engine of FIG. 4 installed into the retainer of FIG. 5.

A number of retainers, 22, are positioned about the periphery of container well 14. Each retainer has an elongate body, 24, which is equipped with a pair of guide pins, 26 (FIGS. 2 and 5). Guide pins 26 interact with translational articulation slots 38, formed in standoff brackets 42, to permit retainer bodies 24 to both rotate and move translationally into contact with a container, such as the illustrated container, 18 (FIG. 2) placed within container well 14. Note that standoff brackets 42 are attached to the outer surface of container well 14.

The ability of retainer bodies 24 to move both rotationally and translationally is important, because in addition to varying in size, commonly used containers are frequently tapered, either from top to bottom, or vice versa. Proper retention of a container within well 14 is further promoted by concave surface 30 (FIG. 3), which constitutes the most radially inward portion of retainer body 24. The rotational and translational motion of retainer bodies 24 is driven by resilient elastic bands, 46, which function as tension cables to press retainer bodies radially inward toward the central axis of container well 14, and into contact with a container, such as container 18, while at the same time promoting rotational adjustment, if any, necessitated by a tapered container configuration.

Figure 7:
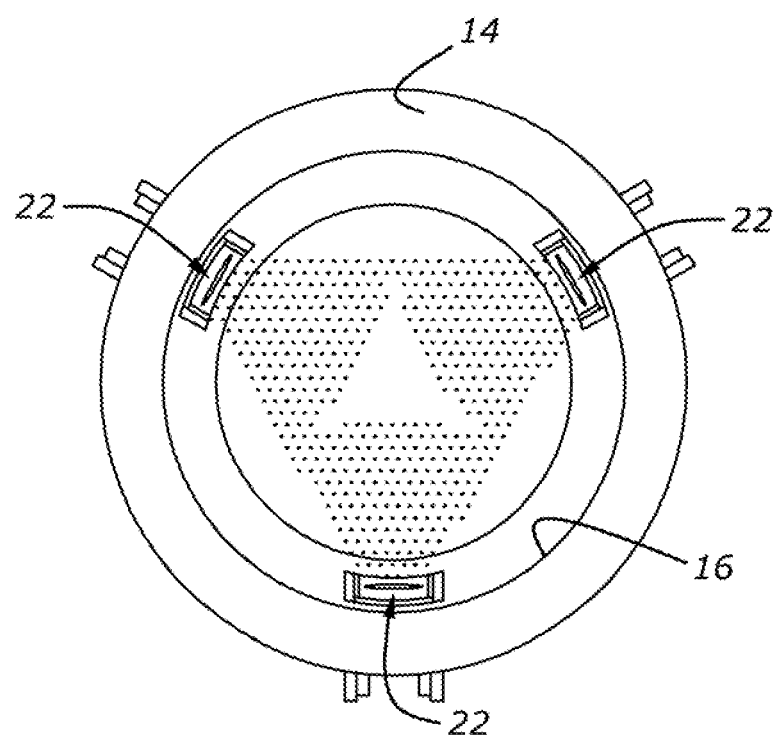
FIG. 7 is a plan view of a cupholder well having illumination emanating from retainers according to an aspect of the present invention.

Nighttime operation of the present cupholder is enhanced by the presence of integral light engines, 50, which may be configured as either LED units, or light pipes, or other types of ambient lighting known to those skilled in the art and suggested by this disclosure. Retainer bodies 24 may be configured from semi-transparent or translucent plastic, allowing light from engines 50 to be projected as shown in FIG. 7, into the interior of container well 14. Equally important, the translucent character of retainer bodies 24 allows the retainers to transmit light along the wall of a container installed in cupholder 10. This provides a ready reference to locate a cupholder and container within a darkened automotive passenger cabin. If desired, a light port, 34 (FIG. 3), may be provided in retainer body 24 to permit direct impingement of light from engines 50 into the interior of container well 14. In any event, attachment of light engines 50 to retainer bodies 24, which is facilitated by mounting sleeve 28 incorporated in body 24 (FIG. 5), allows light emitted by light engines 50 to track movement of retainer bodies 24, as well as any container carried within the cupholder.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive cupholder, comprising:
   a container well;
   a plurality of resiliently biased translucent retainers extending through a sidewall of said container well; and
   a plurality of light engines projecting light through said retainers and into said container well, wherein said light engines comprise light emitting diodes, and wherein each of said retainers has a separate light engine.

2. The automotive cupholder according to claim 1, wherein said container well has a generally circular inner wall.

3. The automotive cupholder according to claim 1, wherein said retainers are resiliently biased toward a longitudinal central axis of said container well.

4. The automotive cupholder according to claim 1, wherein said retainers comprise translucent plastic.

5. The automotive cupholder according to claim 1, wherein each of said retainers comprises a ported body having one of said light engines attached to the retainer and projecting light through a port and into said container well.

6. The automotive cupholder according to claim 1, wherein each of said retainers comprises an elongate body having a concave surface for contacting a container and a guide pin engaging a translational articulation slot, permitting the elongate body to rotate and move translationally into contact with a container placed within said container well.

7. The automotive cupholder according to claim 6, further comprising at least one resilient element for biasing said retainers into contact with a container placed within said container well.

8. The automotive cupholder according to claim 1, wherein said retainers are resiliently biased toward a central axis of said container well by a plurality of elastic elements.

9. The automotive cupholder according to claim 8, wherein said elastic elements comprise elastic bands.

10. An automotive cupholder having configuration and size adjustability and ambient lighting, said cupholder comprising:
    a container well;
    a plurality of retainers extending through a sidewall of said container well, with each of said retainers comprising an elongate body having a plurality of guide pins engaging translational articulation slots provided in standoff brackets attached to said container well, thereby permitting the elongate body to rotate and move translationally into contact with a container placed within said container well; and
    a plurality of resilient elements for biasing said the elongate body of each retainer into contact with a container placed within said container well, with each retainer being biased by at least two resilient elements causing rotational and translational movement of the retainer into contact with a container.

11. The automotive cupholder of claim 10, further comprising at least one light engine attached to and providing illumination through at least one of said retainers and into the interior of said container well.

12. The automotive cupholder of claim 11, wherein said at least one light engine comprises a light pipe.

13. The automotive cupholder of claim 10, wherein said resilient elements comprise elastic tension cables.

14. The automotive cupholder according to claim 10, wherein said retainers comprise semi-transparent plastic.

\* \* \* \* \*